US009575907B2

(12) United States Patent
Walker

(10) Patent No.: US 9,575,907 B2
(45) Date of Patent: *Feb. 21, 2017

(54) MEMORY APPARATUSES, COMPUTER SYSTEMS AND METHODS FOR ORDERING MEMORY RESPONSES

(71) Applicant: MICRON TECHNOLOGY, INC., Boise, ID (US)

(72) Inventor: Robert M. Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 32 days.

This patent is subject to a terminal disclaimer.

(21) Appl. No.: 14/531,074

(22) Filed: Nov. 3, 2014

(65) Prior Publication Data
US 2015/0052318 A1  Feb. 19, 2015

Related U.S. Application Data

(63) Continuation of application No. 13/324,877, filed on Dec. 13, 2011, now Pat. No. 8,880,819.

(51) Int. Cl.
*G06F 13/16* (2006.01)
*G06F 13/18* (2006.01)

(52) U.S. Cl.
CPC ...... *G06F 13/1626* (2013.01); *G06F 13/1668* (2013.01); *G06F 13/18* (2013.01)

(58) Field of Classification Search
CPC ...... G06F 13/18; G06F 13/00; G06F 13/1626; G06F 13/1668; G06F 13/36; G06F 13/1642; G06F 13/376; G06F 13/4031
See application file for complete search history.

(56) References Cited

U.S. PATENT DOCUMENTS

| 6,272,600 B1 | 8/2001 | Talbot et al. |
| 6,477,610 B1 | 11/2002 | Willenborg |

(Continued)

FOREIGN PATENT DOCUMENTS

| JP | 05151171 A | 6/1993 |
| JP | 07036704 A | 2/1995 |
| JP | 2010287058 A | 12/2010 |

OTHER PUBLICATIONS

International Search Report and Written Opinion for International Application No. PCT/US2012/063327, dated Jan. 17, 2013.

(Continued)

*Primary Examiner* — Hashem Farrokh
(74) *Attorney, Agent, or Firm* — Dorsey & Whitney LLP

(57) ABSTRACT

Memory apparatuses that may be used for receiving commands and ordering memory responses are provided. One such memory apparatus includes response logic that is coupled to a plurality of memory units by a plurality of channels and may be configured to receiving a plurality of memory responses from the plurality of memory units. Ordering logic may be coupled to the response logic and be configured to cause the plurality of memory responses in the response logic to be provided in an order based, at least in part, on a system protocol. For example, the ordering logic may enforce bus protocol rules on the plurality of memory responses stored in the response logic to ensure that responses are provided from the memory apparatus in a correct order.

20 Claims, 6 Drawing Sheets

(56) References Cited

U.S. PATENT DOCUMENTS

| | | | |
|---|---|---|---|
| 6,510,474 | B1 | 1/2003 | Stracovsky et al. |
| 6,748,493 | B1 | 6/2004 | Arroyo et al. |
| 6,820,181 | B2 | 11/2004 | Jeddeloh et al. |
| 7,188,219 | B2* | 3/2007 | Jeddeloh ............. G06F 13/1642 710/310 |
| 7,373,437 | B2 | 5/2008 | Seigneret |
| 7,587,521 | B2 | 9/2009 | Akiyama et al. |
| 7,685,392 | B2 | 3/2010 | Coteus et al. |
| 7,925,804 | B2 | 4/2011 | Nara |
| 8,838,853 | B2 | 9/2014 | Sukonik et al. |
| 9,104,555 | B2 | 8/2015 | Liebowitz et al. |
| 2008/0104352 | A1 | 5/2008 | Talbot |
| 2008/0276240 | A1 | 11/2008 | Ganesh et al. |
| 2010/0085804 | A1 | 4/2010 | Katagiri et al. |
| 2010/0153663 | A1 | 6/2010 | Sugano et al. |
| 2010/0185808 | A1 | 7/2010 | Yu et al. |
| 2011/0179200 | A1* | 7/2011 | Sukonik ................... G06F 13/16 710/53 |
| 2012/0137078 | A1* | 5/2012 | Biswas ............... G06F 13/1673 711/130 |
| 2013/0019048 | A1 | 1/2013 | Bland et al. |
| 2013/0151741 | A1 | 6/2013 | Walker |

OTHER PUBLICATIONS

Extended European Search Report issued for EP Appl. No. 12 85 7508 mailed on Feb. 6, 2015.
Office Action of the Intellectual Property Office issued for TW Patent Appl. No. 101143134 mailed on Jan. 21, 2015.
"Notice of Preliminary Rejection issued for KR Appl. No. 10-2014-7019039 on Feb. 11, 2015".
"First Office Action for JP Appl # 2014-547242 dated May 26, 2015", 5 pages.
Notice of Last Preliminary Rejection dated Sep. 7, 2015 for KR Appl. No. 10-2014-7019039, 1 page.
Decision of Refusal dated Sep. 8, 2015, for JP Appl. No. 2014-547242 (English translation only).
First Office Action received for Appl. No. 201280061777.8 dated Oct. 23, 2015 (English translation only).
Notice pf Last Preliminary Rejection dates Jun. 28, 2016 for KR Appl. No. 10-2014-7019039; pp. all (with English translation).
Second Office Action for PRC (China) Pat. Appl. No. 201280061777.8 dated Aug. 30, 2016, with English Translation; pp. all.
JP Appeal Decision received for JP Appl. No. 2014-547242 dated Jan. 10, 2017; pp. all.

* cited by examiner

MEMORY APPARATUSES, COMPUTER SYSTEMS AND METHODS FOR ORDERING MEMORY RESPONSES

CROSS REFERENCE TO RELATED APPLICATION(S)

This application is a continuation of U.S. patent application Ser. No. 13/324,877, filed Dec. 13, 2011, which application is incorporated herein by reference, in its entirety, for any purpose.

TECHNICAL FIELD

This invention relates to memory apparatuses, and more particularly, in one embodiment to memory controllers allowing for concurrent use of multiple memory channels.

BACKGROUND OF THE INVENTION

As input/output speeds of memory devices have increased in recent years, newer implementations have begun to approach performance limitations, thereby exhausting the utility of conventional architectures.

Consequently, to compensate, sonic approaches have turned toward adopting multi-channel memory architectures, wherein a memory unit may be accessed by simultaneous commands via separate, independent logical channels. This allows commands to pass through command queues at a more efficient rate as commands may be provided as soon as a channel becomes available. In short, the amount of time a command is held in a queue is reduced.

However, this approach is not without its drawbacks. Traditionally, the ordering of commands by a memory controller have been enforced at the transaction queue level. That is, ordering logic has been used to enforce particular ordering rules on the command queue for providing commands to the memory units such that the order in which responses are returned from memory units is in accordance with a desired response order. Therefore, under this scheme, the performance of a multi-channel memory access scheme is hindered by the fact that some commands cannot be provided (e.g. issued) even when a channel is available as, in some cases, a response corresponding to a prior command must be received from a memory unit before the waiting command can be provided. While this implementation ensures that responses are returned in the correct order, available channels remain unused while the memory controller waits to receive the response from the memory unit.

Accordingly, there is therefore a need for an improved memory apparatus and method that utilizes multi-channel memory accesses and provides commands to memory units over available channels irrespective of when responses are provided.

DETAILED DESCRIPTION

Certain details are set forth below to provide a sufficient understanding of embodiments of the invention. However, it will be clear to one skilled in the art that embodiments of the invention ma be practiced without these particular details. Moreover, the particular embodiments of the present invention described herein are provided by way of example and should not be used to limit the scope of the invention to these particular embodiments. In other instances, well-known circuits, control signals, timing protocols, and software operations have not been shown in detail in order to avoid unnecessarily obscuring the invention.

Figure 1:
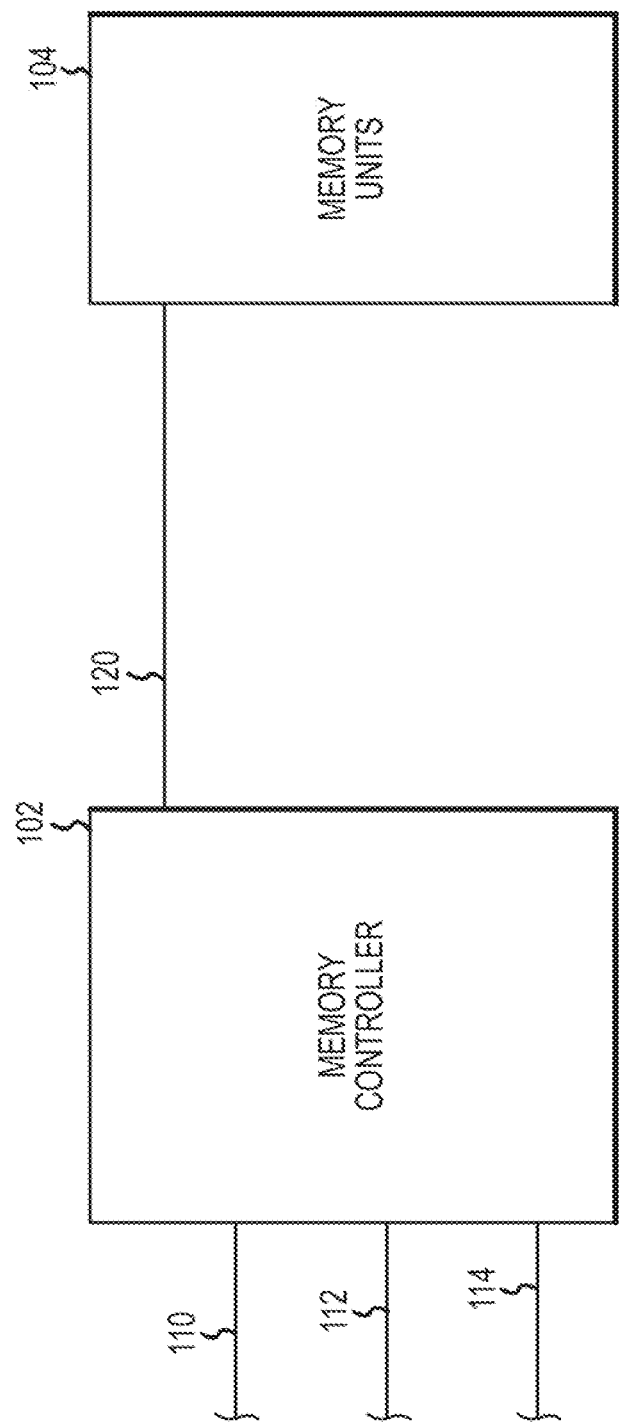
FIG. 1 is a block diagram of a memory apparatus according to an embodiment of the invention.

FIG. 1 illustrates a memory apparatus 100 according to one embodiment of the present invention. A memory apparatus could be a single memory device, for example, or a combination of separate devices. It could be in the form of a single semiconductor die or a combination of dies, and could be in a single package or in a combination of packages. The memory apparatus 100 may include a memory controller 102 coupled to data bus 110, address bus 112, and command bus 114 to receive data, address, and command signals, respectively. The memory controller may be further coupled to a plurality of memory units 104 via a communication bus 120. The memory controller is configured to perform various memory functions, such as providing memory commands to the memory units 104, in response to which the memory units 104 generate corresponding memory responses. The memory controller is further configured to provide memory responses based, at least in part, on an order dictated by a system bus protocol. In at least one embodiment, memory responses may comprise read data corresponding to a read command and/or write confirmation data corresponding to a write command. Memory responses may further comprise other types of data and are not limited by the description herein.

Memory units 104 may comprise any number of memory units and further may comprise any number of logical memory partitions. Additionally, communication bus 120 may comprise any number of bit lines and any number of logical channels. For example, in one embodiment, each memory unit may correspond to a same number of logical channels, such as 8 channels per unit. Moreover, in at least one embodiment, the number of logical memory partitions in memory units 104 and/or the number of logical channels of the communication bus 120 may be changed, for example, by increasing or decreasing a number of independent chip select signals used to control memory units 104. It will be appreciated by those having ordinary skill in the art that other implementations, such a separate control logic unit configured to increase or decrease the number of channels associated with each memory unit 104, may also be used without departing from the scope of the present invention.

In operation, memory controller 102 may receive commands over command bus 114 and provide the received commands to the memory units 104. For example, commands may be provided over command bus 114 to the memory controller 102 by a system bus slave (not shown).

Commands may be provided by other devices as well. Each command received by memory controller 102 may be queued and subsequently checked by ordering logic, for read/write hazard conflicts. A hazard conflict may refer to an operation error resulting from a particular order (e.g. sequence) of commands, such as a page conflict between read and write commands provided to the same row(s) of memory units 104. The ordering logic may be included in memory controller 102, and in an alternative embodiment, the ordering logic may be separate from memory controller 102.

In addition to hazard checks, ordering logic in Memory controller 102 may determine whether a queued command follows a barrier command. In response to receipt of a barrier command, the ordering logic may delay providing subsequently received commands to memory units 104 until responses corresponding to commands received prior to receipt of the barrier command have been provided from memory units 104 to the system bus slave (or other devices providing commands to the memory controller 102) in a required order, as controlled by ordering logic in the memory controller 102. Finally, the ordering logic may also determine whether queued commands may produce a page hit. That is, memory controller 102 may determine whether a same row of memory units 104 may be accessed by two or more queued commands without closing and reopening the row between providing each command to the memory units 104. If a page hit is detected, the ordering logic ma order (e.g. reorder) the commands in the queue, for example, advance or delay one or more commands in the queue, to reduce the number of times a particular row must be opened and closed.

As previously described, memory controller 102 may be configured to order (e.g. reorder) memory responses based, at least in part, a system bus protocol, and memory controller 102 may be configured to provide commands to memory units 104 as they are received over command bus 114, provided a received command does not create a hazard conflict or page hit, or follow a barrier command. As a result, there is a possibility memory responses provided to memory controller 102 from memory units 104 may not match the order in which corresponding commands were provided to the memory units 104, nor match the order required by the system protocol. In order to provide memory responses to a device (e.g., system bus slave) in accordance with a required order, regardless of the order the responses are provided from the memory units 104 to the memory controller 102, memory controller 102 may control the order of the responses provided by the memory controller such that the responses are returned in the required order.

As will be explained in more detail below, with the exception of some commands (e.g., hazards, page bits, and barrier commands) a command may be provided to memory units 104 immediately after it has been queued, because the ordering logic allows commands to be provided in virtually any sequence to memory units 104. Briefly, a command may he provided to a memory unit 104 as soon as a memory channel corresponding to the memory unit 104 is available. In at least one embodiment, because each unit typically corresponds to multiple channels, multiple memory commands may be provided concurrently to the same memory unit 104.

Commands received by memory controller 102 may include master identification bits (master IDs) indicating a system bus master requesting issuance of the command and transaction identification bits (transaction IDs) indicating a transaction stream within the requesting, master. If through a system bus slave 202 (FIG. 2), a system bus master provides multiple commands to memory controller 102, with the commands corresponding to the same transaction stream, the requesting system bus master may not be able to differentiate responses without relying on the order in which the responses are provided. That is, the order of the responses should correspond to the required order dictated by the master for correct operation to occur. Thus, if after providing commands to memory units 104, the corresponding memory responses are not provided from the memory units 104 to memory controller 102 in the required order, memory controller 102 should reorder the responses when providing them to the system bus slave 202.

Figure 2:
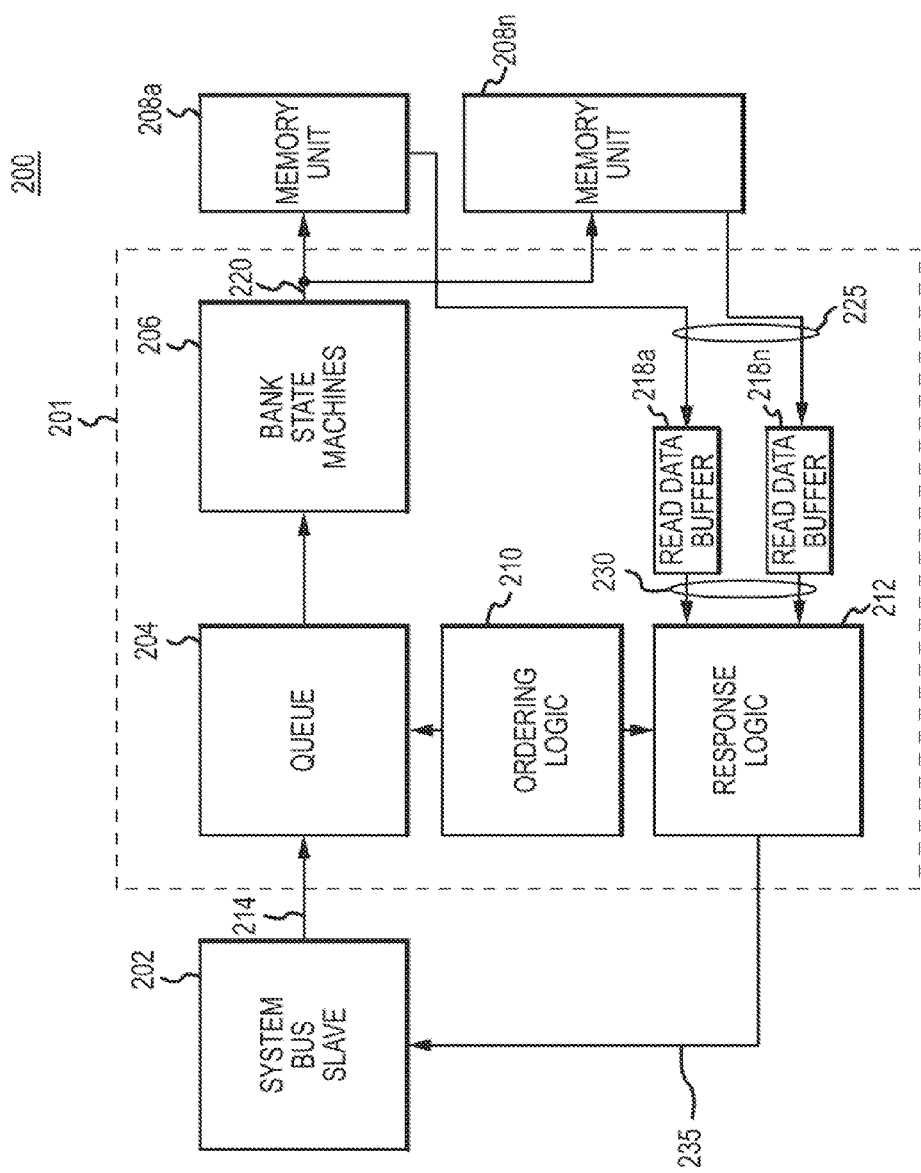
FIG. 2 is a block diagram of a memory apparatus including a memory controller that may be used in FIG. 1 according to an embodiment of the invention.

FIG. 2 illustrates a memory apparatus 200 according to an embodiment of the invention. Memory apparatus 200 may include a memory controller 201 that, in at least one embodiment, may be used in the memory apparatus 100 of FIG. 1. Memory controller 201 may include a queue 204 coupled to a bank state machine 206 and ordering logic 210. The queue 204 is configured to receive commands from a system bus slave 202 over a command bus 214. The bank state machine 206 may be coupled to the memory units 208a-n by a communication bus 220. Additionally, memory controller 201 may further comprise response logic 212 and read data buffers 218a-n. Read data buffers 218a-n may be coupled to memory units 208a-n, respectively, by the communication bus 225, and each read data buffer 218a-n may be further coupled to response logic 212 by a buffer bus 230 as well. Finally, response logic 212 may be coupled to the system bus slave 202 by a response bus 235. In at least one embodiment, response bus 235 may be physically separate from other busses, or may multiplexed with other busses, such as command bus 214.

In operation, commands may be provided from the system bus slave 202 to queue 204 of memory controller 201 over the command bus 214. There, the ordering logic 210 may check the received commands for hazard conflicts, barrier commands, and page hits, as previously described. In at least one embodiment, such as that illustrated in FIG. 2, the queue 204 may be used to store received, commands for a plurality of memory units 208a-n. In another embodiment, each memory unit 208a-n may be coupled to a respective queue 204a-n.

Queued commands may be provided to the bank state machine 206, wherein each command may be provided to memory units 208a-n once a channel becomes available for the memory unit 208a-n to be accessed. In one embodiment, the bank state machine 206 may contain control logic to determine whether a channel is available, or in another embodiment, the bank state machine 206 may receive a signal from external control logic indicating that a particular channel is available for a command. Moreover, in one embodiment, multiple bank state machines 206 may be used. For example, the memory controller 201 may include a bank state machine 206 corresponding to each channel of each memory bank 208a-n. Memory controller 201 may alternatively use any number of bank state machines 206 per channel.

Once a command has been provided to a memory unit 208, the memory unit 208 may provide a response to the corresponding read data buffer 218. While in one embodiment, each memory unit 208a-n may correspond to a read buffer 218a-n in another embodiment, memory units 208a-n may be coupled with, and provide responses to, a single read data buffer 218 (not shown). It will be appreciated by those having ordinary skill in the art that variations in the implementations of the read data buffers 218a-n may be made without departing from the scope of the present invention, and that embodiments are not limited by the specific embodiments set forth herein.

Responses may be provided from the read data buffers 208a-n and received by the response logic 212 over the buffer bus 230. Once received by the response logic 212, the ordering logic 210 may cause the responses to be ordered such that they are placed into the order (e.g. sequence) required by the requesting system bus master, as described above. For example, the ordering logic 210 can be configured to enforce bus protocol rules on responses stored in the response logic 212 to ensure that responses are provided in a correct order first to the system bus slave 202 over the response bus 235, and ultimately to the requesting system bus master. The ordering logic 210 may cause the responses received by the response logic 212 to be provided based, at least in part, on an order that is independent of the order in which the responses were received by the response logic 212.

Figure 3:
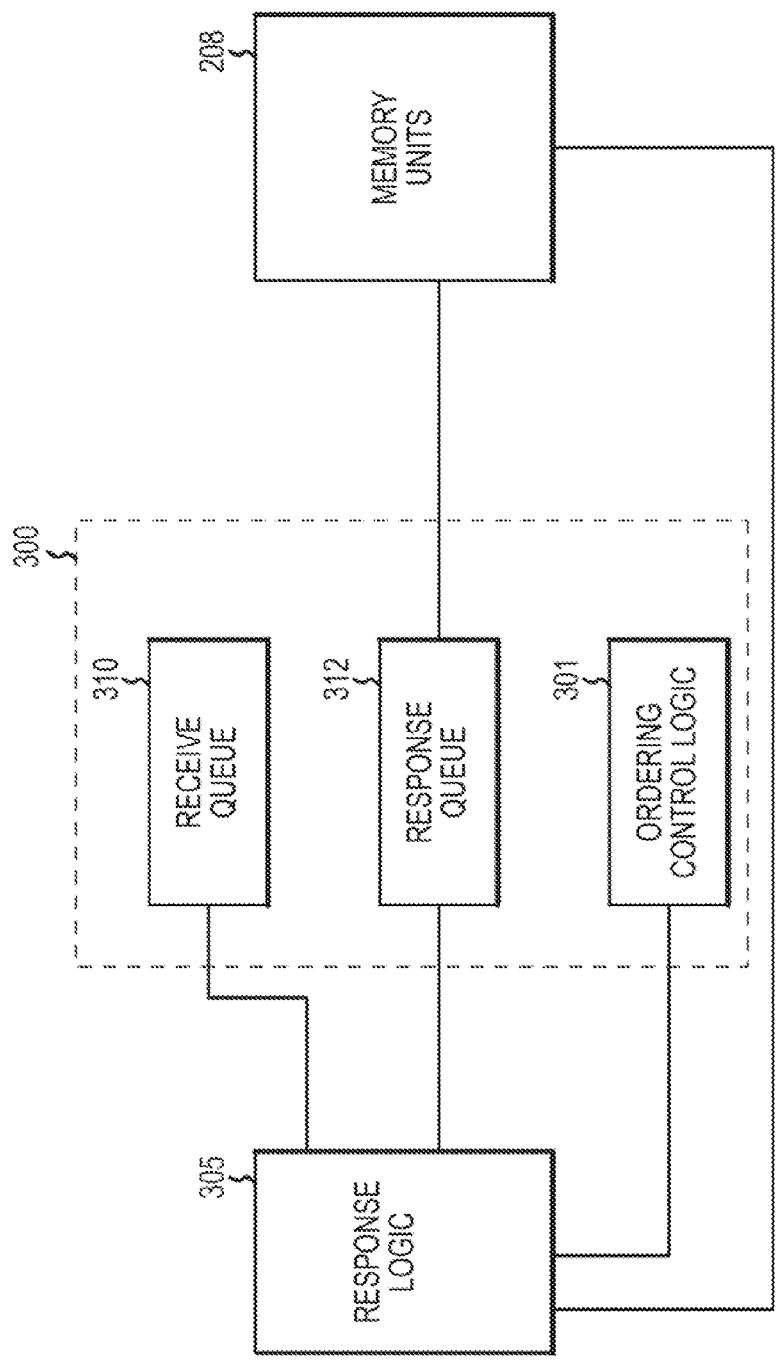
FIG. 3 is block diagram of an ordering logic unit according to an embodiment of the invention that may be used in the memory controller of FIG. 2.

FIG. 3 is a block diagram illustrating ordering logic 300 according to an embodiment of the invention. The ordering logic 300 may be used as the ordering logic 210 in memory apparatus 200 of FIG. 2. The ordering logic 300 may include ordering control logic 301, a receive queue 310 and a response queue 312, all of which may be coupled to response logic 305. Receive queue 310 may be configured to store master IDs, transaction IDs, and read identification bits (read IDs) and response queue 312 may be configured to store channel select bits and read IDs. Moreover, in at least one embodiment, receive queue 310 may be implemented as a shift buffer.

In operation, when a system bus slave 202 provides a command to queue 204 (FIG. 2), receive queue 310 may also receive the command and store the master ID and transaction ID corresponding to the command. Moreover, receive queue 310 may generate a unique read ID for the command, allowing the command to be distinguished from commands corresponding to the same master ID and transaction ID. As commands are provided to memory units 208a-n and corresponding responses are provided as described above, each response may be stored in response logic 305. Additionally, the read ID and channel select bits corresponding to each response may be provided to the response queue 312 identifying which command each response corresponds to as well as which channel provided the response. Because some commands may require use of multiple channels, use of channel select bits allows response queue 312 to ensure that a complete response is provided for each command. In some embodiments, channel select bits may be one-hot encoded or may use binary for channel identification.

As described above, as responses are accumulated in response logic 305, ordering control logic 301 may cause response logic 305 to provide responses to the system bus slave 202 based, at least in part, on the order required by the requesting master. For example, in at least one embodiment, if responses stored in response logic 305 comprise the same master and transaction IDs, the responses may only be distinguished based on the read ID generated on receipt of the command by the memory controller 201. Responses differentiated in this manner should be provided to the system bus slave 202 in the required order as the requesting master will not otherwise be able to distinguish the responses from one another.

Figure 4:
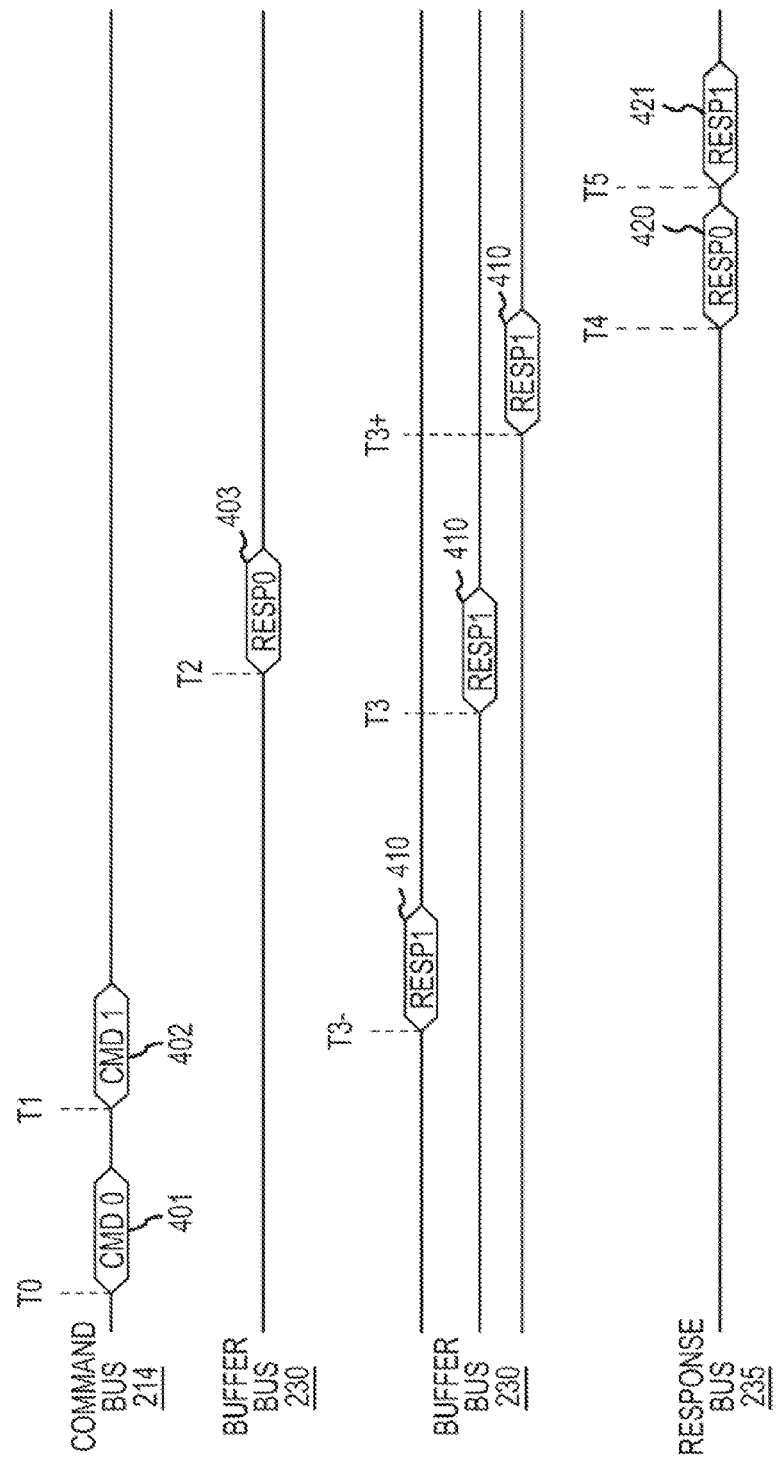
FIG. 4 is a timing diagram that illustrates various signals during operation of the memory apparatus according to an embodiment of the invention.

FIG. 4 is a timing diagram illustrating the operation of the memory apparatus 201 of FIG. 2 according to an embodiment of the invention. A system bus slave 202 (FIG. 2) may provide a command 401 and a command 402 to the memory controller 201 over command bus 214 that may be received at times T0 and T1, respectively. The commands may be provided to memory unit 208a-n, and subsequently, at a time T2, a response 403 may be received at response logic 212 over the buffer bus 230 as a response to the command 401.

A response 410 may correspond to command 402 and be received by the response logic 212 over buffer bus 230 before, concurrently, or after the time T2, as illustrated by responses 410 in FIG. 4 at times T3−, and T3, and T3+, respectively. In one embodiment, such as that shown in FIG. 4, response logic 212 may receive the response 410 before response 403 (e.g., at time T3−). In another embodiment, response logic 212 may receive response 410 after response 403 (e.g., at time T3+). In yet another embodiment, responses 410 and 403 may be received approximately simultaneously (e.g., at time T3).

As described above, commands may be provided to memory unit 208a-n in the order as they are received by memory controller 201 and responses may be provided to the system bus slave 202 in an order required by a requesting master. As a result, regardless of a time at which a response 410 is received by the response logic 212 relative to response 403, the order in which responses are provided to the system bus slave 202 over response bus 235 may remain the same. Responses 420 and 421, for example, may correspond to responses 403 and 410 re-ordered in the order required by a requesting master and be provided at times T4 and T5, respectively. That is, regardless of the order in which responses 403 and 410 are received by the response logic 212 from memory unit 208a-n (e.g., at time T3−, T3, or T+), responses 420 and 421 may be provided in the order as illustrated in FIG. 4. Moreover, as previously described, responses need not be provided in the order corresponding commands were received. For example, in another embodiment, if required, responses 420 and 421 may be provided to the system bus slave such that the response 421 is provided before the response 420.

Figure 5:
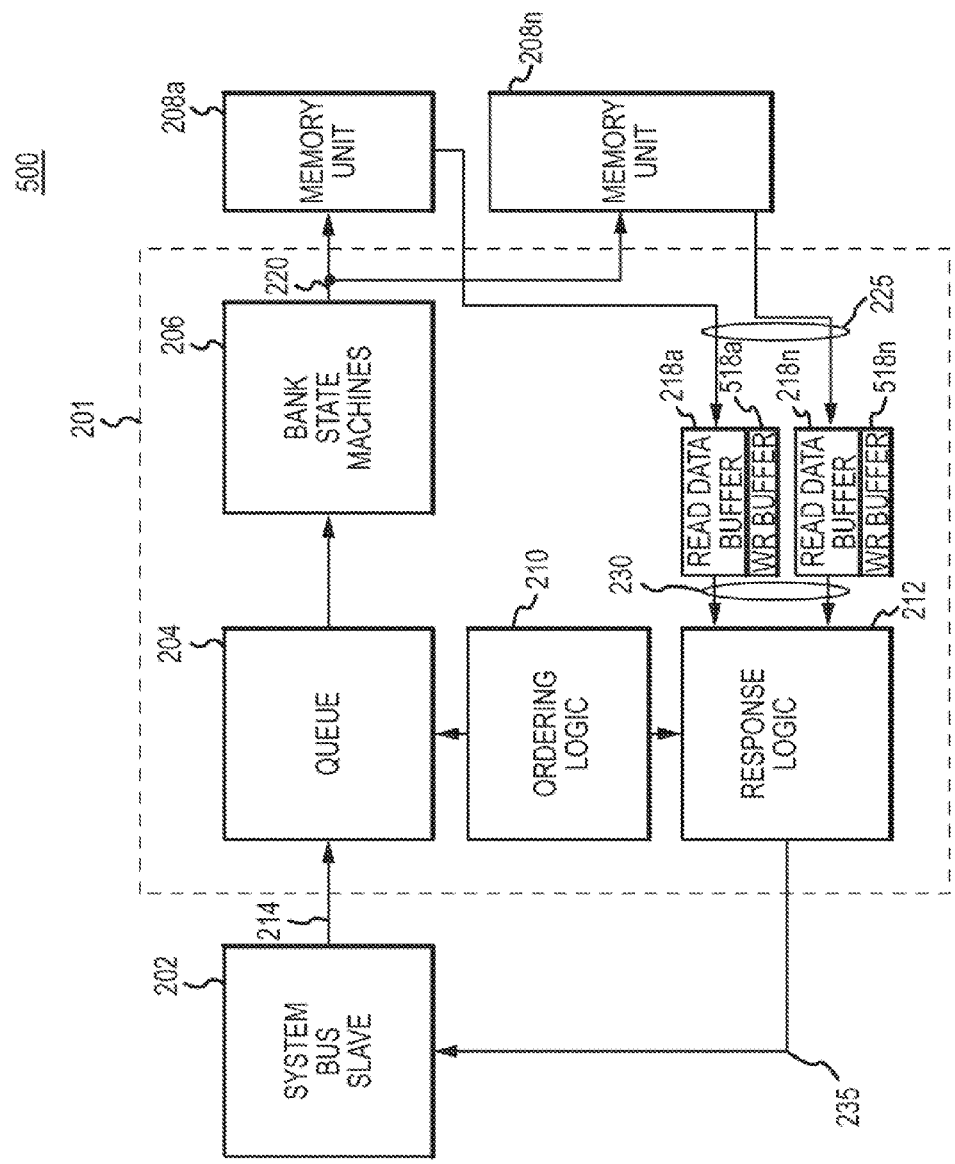
FIG. 5 is a block diagram of a memory apparatus according to an alternative embodiment of the present invention.

FIG. 5 illustrates a memory apparatus 500 according to an alternative embodiment of the present invention. The memory apparatus 500 includes elements that have been previously described with respect to the memory apparatus of FIG. 2. Those elements have been shown in FIG. 5 using the same reference numbers used in FIG. 2 and operation of the common elements is as previously described. Consequently a detailed description of the operation of these elements will not be repeated in the interest of brevity.

In contrast to the memory apparatus 200, memory apparatus 500 further comprises write buffers 518a-n that may be coupled to memory unit 208a-n and configured to store write responses. Write buffers 518a-n may further be coupled to response logic 212, and in one embodiment, may respectively correspond to each unit of memory units 208a-n. In another embodiment, the write buffers 518a-n may correspond to each channel. In yet another embodiment, a single write buffer 518 (not shown) may be coupled to all memory units 208a-n and response logic 212. Those having ordinary skill in the art will appreciate that other implementations, such as a single buffer configured to store both read and write responses, may also be used without departing from the scope of the present invention.

In operation, memory units 208a-n may be provided write commands and provide write responses in return. Each write response may be subsequently provided to a write buffer 518 which may in turn provide the responses to response logic 212. Response logic 212 may provide the write responses to the system slave bus 202 in the order required. In one embodiment, ordering logic 210 may cause the response logic 212 to provide write responses to the system bus slave 202 independently of the order in which read responses are provided. In another embodiment, the ordering, logic 210 may cause write responses to be provided based, at least in part, on the order in which read responses are provided.

Figure 6:
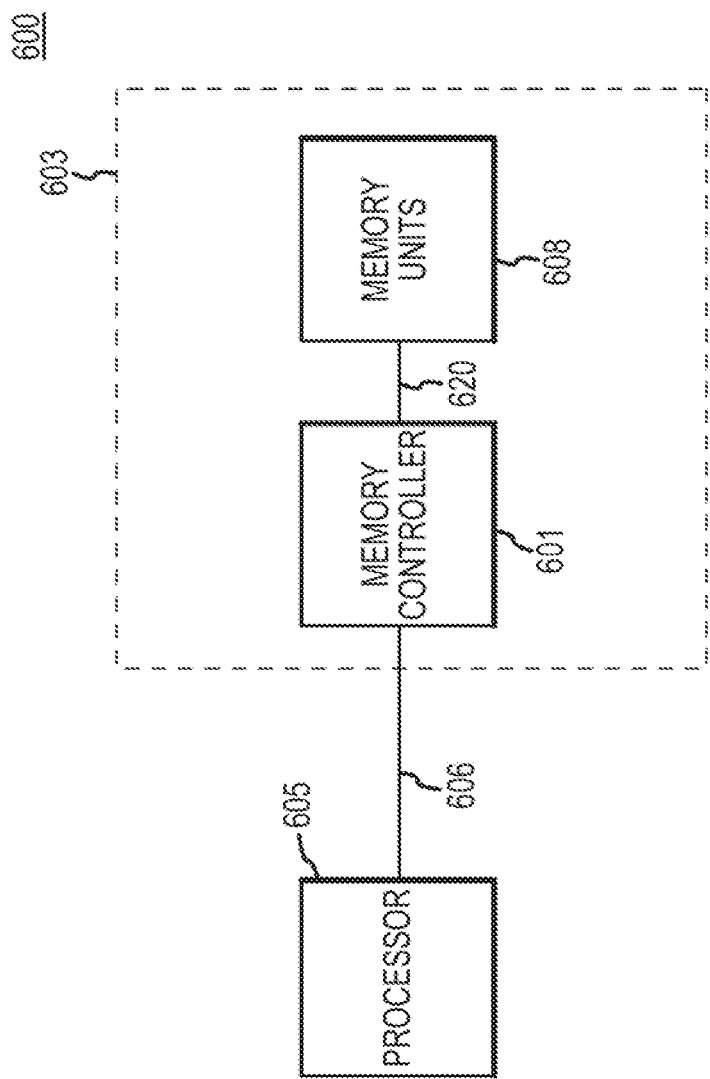
FIG. 6 is a block diagram of a computer system according to an embodiment of the invention.

FIG. 6 illustrates a computing system 600 according, to an embodiment of the invention. Computing system 600 may include a processor 605 configured to perform various computing functions, and a memory apparatus 603. Memory apparatus 603 may be coupled to processor 605 by a bus 606 and further may include a memory controller 601 and memory units 608 that are coupled by a communications bus 620. In at least one embodiment, memory controller 601 may be the memory controller 201 in the embodiment illustrated in FIG. 2. In some embodiments, computing system 600 may comprise a desktop computer, laptop, telephone, personal digital assistant (PDA), media player (i.e., an MP3 player), server, appliance, gaming device, networking device (i.e. routers), television, or other device that may be configured to execute at least part of any one of the processes described herein. Computing system 600 may also comprise any combination of these devices.

In operation, as described above with reference to FIG. 2, a system bus slave (not shown) receive memory commands from a system bus master (not shown). The memory controller 601 may receive the commands from the system bus slave and provide the commands to the memory units 608, as described above with reference to FIG. 2. In some embodiments, the system bus master may be included in the processor 605, or alternatively, may be included in a system controller (not shown) and receive commands from processor 505. Moreover, in at least one embodiment, memory controller 601 may also be included in the system controller.

From the foregoing it will be appreciated that, although specific embodiments of the invention have been described herein for purposes of illustration, various modifications may be made without deviating, from the spirit and the scope of the invention. For example, although the embodiments of the invention are explained in the context of ordering responses in memory controllers, it will be understood that responses may be ordered once provided, from a memory controller to a system bus. Accordingly, the invention is not limited except as by the claims.

What is claimed is:

1. An apparatus comprising:
    response logic configured to receive a plurality of read responses and a plurality of write responses; and
    ordering logic coupled to the response logic and configured to cause the plurality of read responses and the plurality of write responses to be ordered,
    wherein an order of the plurality of write responses is independent of an order of the plurality of read responses.

2. The apparatus of claim 1, wherein the plurality of read responses corresponds to a first plurality of commands and wherein the plurality of write responses corresponds to a second plurality of commands.

3. The apparatus of claim 1, wherein the response logic is further configured to provide the plurality of read responses and the plurality of write responses to a system bus master responsive to the ordering logic causing the plurality of read responses and the plurality of write responses to be ordered.

4. The apparatus of claim 1, wherein the response logic is configured to receive the plurality of read responses and the plurality of write responses based on at least one memory unit of a plurality of memory units having an available logical channel.

5. The apparatus of claim 1, wherein the response logic is configured to store the plurality of read responses and the plurality of write responses.

6. The apparatus of claim 1, wherein the ordering logic is configured to cause the plurality of read responses and the plurality of write responses to be ordered based on a respective identification bit of each read response of the plurality of read responses and each write response of the plurality of write responses.

7. The apparatus of claim 1, wherein a read response of the plurality of read responses comprises read data and a write response of the plurality of write responses comprises write confirmation data.

8. A method, comprising:
    receiving a plurality of read commands and a plurality of write commands;
    providing the plurality of read commands to a memory unit;
    providing the plurality of write commands to the memory unit;
    receiving a plurality of read responses responsive to providing the plurality of read commands to the memory unit;
    receiving a plurality of write responses responsive to providing the plurality of write commands to the memory unit;
    reordering the plurality of read responses in a first order; and
    reordering the plurality of write responses in a second order, the first order independent of the second order.

9. The method of claim 8, further comprising:
    buffering the plurality of read responses; and
    buffering the plurality of write responses.

10. The method of claim 8, wherein the first order is based on an order of the plurality of read commands and wherein the second order is based on an order of the plurality of write commands.

11. The method of claim 8, wherein receiving a plurality of read responses responsive to providing the plurality of read commands to the memory unit comprises:
    receiving a read response of the plurality of read responses responsive to a logical channel of the memory unit becoming available.

12. The method of claim 8, further comprising:
    reordering the plurality of read commands responsive to identifying at least one of a page hit, a barrier command, or a hazard conflict associated with a read command of the plurality of read commands.

13. The method of claim 8, wherein a read response of the plurality of read responses includes an identification bit.

14. The method of claim 8, wherein providing the plurality of read commands to a memory unit comprises:
    providing the plurality of read commands to the memory unit using a bank state machine.

15. A method, comprising:
    applying ordering logic to a first command and a second command, the first command and the second command arranged in a first order;
    providing a first response corresponding to the first command and a second response corresponding to the second command, the first command and the second command arranged in a second order; and
    applying the ordering logic to the first response and the second response based on the first order and the second order.

16. The method of claim 15, wherein applying the ordering logic to the first response and the second response based on the first order and the second order comprises:
   applying the ordering logic to the first response and the second response to order the first response and the second response in the first order.

17. The method of claim 15, wherein applying ordering logic to a first command and a second command, the first command and the second command arranged in a first order comprises:
   applying the ordering logic based on detection of at least one of a page hit, a hazard, a barrier command, or a combination thereof.

18. The method of claim 15, wherein the first order is independent of the second order.

19. The method of claim 15, further comprising:
   providing the first and second commands to a bank state machine; and
   providing, with the bank state machine, the first and second commands to a memory unit responsive to a logical channel associated with the memory unit being available.

20. The method of claim 15, wherein applying ordering logic to a first command and a second command, the first command and the second command arranged in a first order comprises:
   queuing the first and second commands.

* * * * *